United States Patent [19]
Depenbrock

[11] 3,784,895
[45] Jan. 8, 1974

[54] DEVICE FOR CONVERTING THE ELECTRICAL ENERGY OF A THERMIONIC GENERATOR

[75] Inventor: Manfred Depenbrock, Bochum-Stiepel, Germany

[73] Assignee: Brown, Boveri & Cie AG, Mannheim, Germany

[22] Filed: Aug. 21, 1972

[21] Appl. No.: 282,039

[30] Foreign Application Priority Data
Aug. 21, 1971 Germany............... P 21 42 059.7

[52] U.S. Cl................. 322/2 R, 321/19, 322/25
[51] Int. Cl. ........................................... H02p 13/04
[58] Field of Search................ 322/2 R, 25; 321/2, 321/16, 18, 19

[56] References Cited
UNITED STATES PATENTS

| | | | |
|---|---|---|---|
| 3,648,152 | 3/1972 | Low | 322/2 R |
| 3,381,201 | 4/1968 | Angello | 322/2 R |
| 3,384,806 | 5/1968 | Hartman | 322/2 R |
| 3,437,903 | 4/1969 | Webb | 322/2 R |
| 3,670,234 | 6/1972 | Joyce | 321/2 |
| 3,559,031 | 1/1971 | La Vigna | 321/2 |

*Primary Examiner*—James D. Trammell
*Attorney*—Herbert L. Lerner et al.

[57] ABSTRACT

Device for converting electrical energy of a thermionic generator includes a load and a choke for smoothing current produced by the generator, a p-pulse inverter electrically connected between the load and the smoothing choke, the load being of such value that the generator voltage ($u_g$), is determined by the load voltage ($u_v$), the inverter includes semiconductor rectifiers, control means electrically connected to the inverter and adapted to cut off the same, at least two of the semiconductor rectifiers being series connected in the current path and being feedable with control signals p times during one period of the inverter output voltage simultaneously for a time interval respectively dependent upon the generator current ($i_g$) and on the load voltage ($re_v$).

4 Claims, 6 Drawing Figures

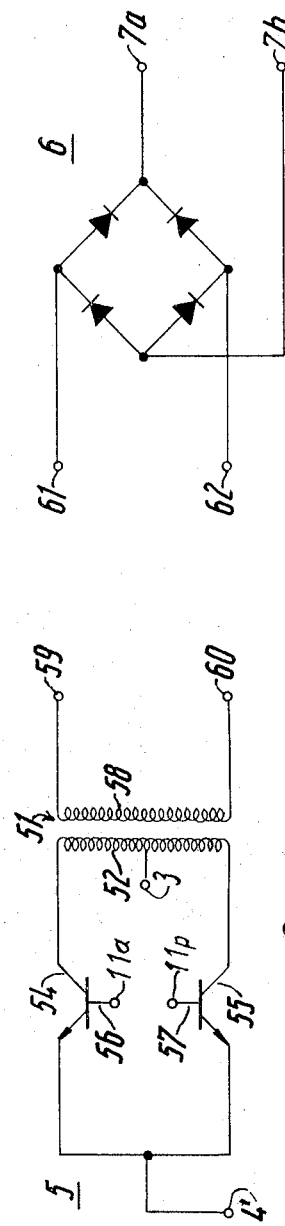
Fig. 2a
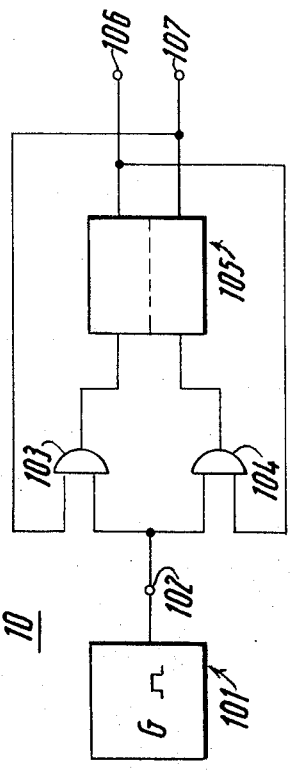
Fig. 2b
Fig. 3

DEVICE FOR CONVERTING THE ELECTRICAL ENERGY OF A THERMIONIC GENERATOR

The invention relates to a device for converting the electrical energy of a thermionic generator, having a inverter with p pulses, which is located between a load and a smoothing choke for the generator current.

In comparison with other electric d-c sources, thermionic generators have characteristics which necessitate the taking of special precautions when such generators are used for feeding loads. One of these characteristics is that because the nuclear fission reaction occurs uninfluenced by external circuit charges, the operation of a thermionic generator is more economical, the larger the electric output delivered, since the nuclear fuel costs depend only to a slight extent on the electric power transmitted. In contrast to conventional current sources, wherein the short-circuit current is generally much larger than the rated or nominal current, a thermionic generator has a nominal or rated current chosen so that it is half the value of the short-circuit current. This feature, however, results in great variations of the output voltage of the thermionic generator when the power consumed by a load is varied due to a change of a load impedance.

A further characteristic or feature results from the fact that the emitter temperature of the thermionic generator is dependent on the load current, when the heat generated in the nuclear fission reaction is constantly supplied. In fact, the emitter temperature falls with increasing load current due to increased energy transport by the multiplied number of electrons; for this reason, one speaks of "electron cooling." Since the generator e.m.f. furthermore increases with rising emitter temperature, one strives, in the interest of attaining the most economical operation, to choose an emitter temperature that is as high as possible at nominal operation. However, the emitter temperature to be selected is below the maximum permissible value in order to avoid overshooting the maximum permissible temperature value in the event of an open circuit. Although the output reduction caused thereby could be avoided through a load dependent control of the heat supply of the generator, a fast acting control device which acts upon the fuel rods of the thermionic generator in dependence upon the variations of the load impedance is required, however, for this purpose. Such a control device, however, represents a considerable technical expenditure.

An additional characteristic or feature of thermionic generators is the possibility, which cannot be disregarded altogether, that within the provided service life of the generator, a part of the series-connected individual cells may fail and the generator e.m.f. be reduced.

It is accordingly an objective of the invention to provide a device which makes it possible to regulate to predetermined values the voltage of a load fed by a thermionic generator, as well as the current of the generator, independently of the load consumption and the generator e.m.f.

An object of the invention is to provide such device which avoids the foregoing disadvantages of heretofore known devices of this general type.

With the foregoing and other objects in view, there is provided in accordance with the invention device for converting electrical energy of a thermionic generator comprising a load and a choke for smoothing current produced by the generator, a p-pulse inverter electrically connected between the load and the smoothing choke, the load being of such value that the generator voltage ($u_a$) is determined by the load voltage ($u_v$), the inverter comprising semiconductor rectifiers, control means electrically connected to the inverter and adapted to cut off the same, at least two of the semiconductor rectifiers being series connected in the current path and being feedable with control signals p times during one period of the inverter output voltage simultaneously for a time interval respectively dependent upon the generator current ($i_a$) and on the load voltage ($u_v$).

In accordance with another feature of the invention, the load comprises an ohmic resistance or resistivity as well as a shunt capacitor and is fed by rectifier means connected to the output of the inverter.

In accordance with a further feature of the invention, the control electrodes of the semiconductor rectifiers are connected through a logic circuit with a control signal unit and a superimposed control device, the control device comprising a respective control for minimum generator current and maximum load voltage as well as a monostable flip-flop which is connected with the controls through a take-over member and which is excited by the control signal unit for transmitting a signal to at least two control electrodes during the time interval determined by the duration of the control signals.

In accordance with yet another feature of the invention, the inverter is a parallel inverter having a center-tapped primary transformer winding, the number of turns of which is chosen at such a turns ratio with respect to the secondary transformer winding that, for minimum values of the load impedance and of the time interval, a maximum load voltage results In accordance with an added feature of the invention, the semiconductor valves or rectifiers that can be cut off are switching transistors.

In accordance with an additional feature of the invention, a series-connected smoothing choke is connected between the thermionic generator and the inverter.

Since the load current of the thermionic generator must not drop below a minimum value which occurs at full load, the emitter temperature of the thermionic generator has, is a maximum value at full load, and falls off if the delivered useful output is reduced. It is thereby possible, with only a small expenditure for circuitry, to operate a thermionic generator always within its optimal temperature range, independently of its e.m.f. and the load consumption. In the event of a reduction of the terminal voltage of the thermionic generator due to aging or short-circuits in some of the cells, the delivered power for constant load impedance does not decrease quadratically but rather linearly with the terminal voltage of the generator.

Although the invention is illustrated and described herein as embodied in device for converting the electrical energy of a thermionic generator it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2a is a circuit diagram of an embodiment of an inverter represented by one of the blocks in FIG. 1;

FIG. 2b is a circuit diagram of an embodiment of a rectifier represented by another of the blocks in FIG. 1;

FIG. 3 is a circuit diagram of an embodiment of a control unit represented by yet another block in FIG. 1;

Figure 1:
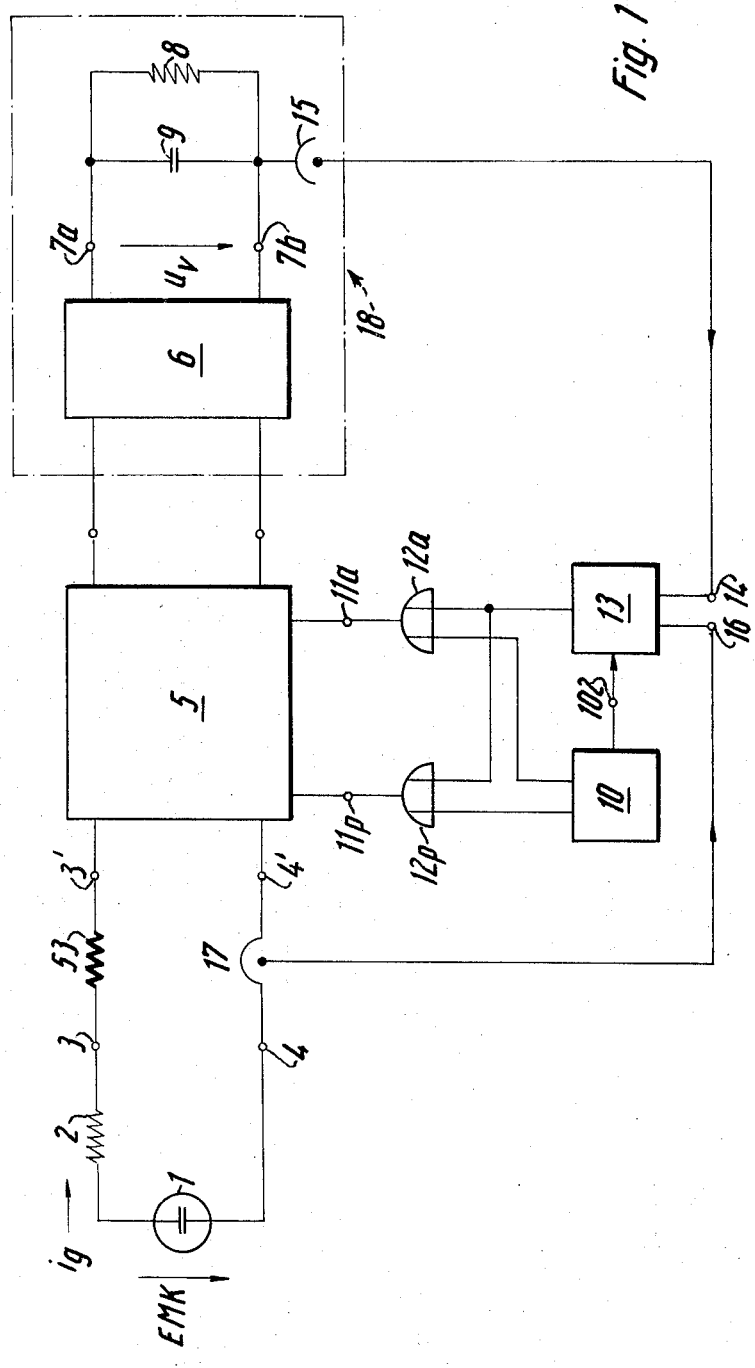
FIG. 1 is an electric block diagram of the device according to the invention.

Referring now to the drawing, and first particularly to FIG. 1, thereof, there is shown therein a d-c source 1 with an internal series resistance 2 which represent a thermionic generator. The generator terminals 3, 4 are connected to input terminals 3', 4' of a p-pulse inverter 5 by means of respective connecting lines. In the event the internal inductance of the generator 1, 2 and the connecting lines is not sufficiently large, a series choke 53 is additionally connected between the generator 1, 2 and the inverter 5. The output terminals of the inverter 5 are connected to a load 18, which includes a rectifier 6 as well as an ohmic resistance or resisitivity 8. For smoothing the output voltage $u_v$ of the rectifier (load voltage), a capacitor 9 is connected in shunt with the resistor 8 and the rectifier output terminals 7a and 7b.

The p-pulse inverter 5 is fed control pulses by the control unit 10 in periodic sequence, which ignite and extinguish i.e. render operative and inoperative, respectively, the p semiconductor valves of the inverter 5. The p control inputs 11a to 11p of the inverter 5 are connected, respectively, to p outputs of the control unit 10 through respective OR gates 12a to 12p, the first inputs of the OR gates 12a to 12p respectively leading to the corresponding output of the control unit 10. The second inputs of the OR gates 12a to 12p are connected in parallel to the output of a control device 13 which also delivers a periodic sequence of control pulses simultaneously to the control electrodes of all of the inverter valves. The frequency of the control pulses of the control device 13 is determined by the control unit 10, which is connected by an output 102 thereof to a corresponding control input of the control device 13. The control device 13 further has actual-value inputs 14 and 16, the actual-valve input 14 being fed by a voltage transmitter or transformer 15 and the actual-valve input 16 by a current transformer 17. The voltage transmitter 15 serves for measuring the load voltage $u_v$, and the current transformer 17 for measuring the generator current $i_g$. If the instantaneous value of the measured load voltage $u_v$ exceeds a definite limit $u_{v\ max}$ or if the instantaneous value of the measured generator current $i_g$ falls below a definite limit $i_{g\ min}$, the control device 13 intervenes by forming output signals with a signal length $\Delta t_k$. Such an overshooting or undershooting of the predetermined limits can occur if there is an increase in the load impedance reduction in the generator-load or there is a decrease in the generator e.m.f. (short circuit of a thermionic cell). The output signals of the control device 13 respectively open or render operative two inverters valves which alternate as to phase sequence during the time interval $\Delta t_k$, so that the inverter 5 is short-circuited on the input side within this interval. The signal frequency of the control device 13 corresponds, as aforementioned hereinabove, to the signal frequency of the control unit 10, so that the inverter 5 is short-circuited p times during each period of its output voltage. The short-circuiting of the inverter 5 results in the interruption of the current flow to the load 18, whereby the mean value of the load current decreases and the mean value of the load voltage $u_v$ remains constant even if the load impedance is increased. In case the generator e.m.f. is decreased the mean value of the generator current $i_g$ increases due to the short-circuiting of the inverter 5 on the input side thereof, so that the mean value of the generator current does not fall below the predetermined limit.

In FIG. 2a, an embodiment of the inverter 5 is shown in the form of a two-pulse parallel inverter. The inverter 5 contains a transformer 51 having a primary winding 52 that is connected through a center tap to the first input terminal 3' of the inverter. The two ends of the primary winding 52 are connected to the other input terminal 4' of the inverter through respective transistors 54 and 55. In lieu of the transistors 54 and 55, thyristors that can be cut off by control pulses, can also be used, for example. The control electrodes 56 and 57 of the respective transistors 54 and 55 lead to one of the respective outputs 11a to 11p of the OR gates 12a to 12p and are driven by control signals in the manner described hereinabove.

The generator current $i_g$, when the input of the inverter 5 is not short-circuited, i.e., for alternating transmission of current through the transistors 54 and 55 flows through, respectively, only half of the primary winding 52 in periodic sequence. An alternating current is induced in the secondary winding 58 of the transformer 51 only if one of the transistors 54 and 55, respectively, is conductive at that time. If the transistors 54 and 55 are switched on simultaneously during the time interval $\Delta t_k$, the primary winding 52 is short-circuited, so that the current flows induced in the two primary winding halves cancel, and the secondary winding 58 is consequently without voltage and current.

In FIG. 2b, the rectifier 6 is shown in detail in the form of a Graetz bridge rectifier. The inputs 61 and 62 of the rectifier 6 are connected to the outputs 59 and 60, respectively, of the secondary winding 58 of the inverter 5. If a multi-pulse inverter 5 is provided, the number of bridge halves of the rectifier bridge 6 must be increased so as to correspond to the number of pulses p of the inverter.

In FIG. 3, there is shown an embodiment of the control unit 10 which is symbolized by a block in FIG. 1. The control unit 10 includes a pulse generator 101, having a control output 102 that is connected to respective first inputs of AND gates 103 and 104 are connected to a respective input of a bistable flip-flop member 105 which can assume two stable output states. The outputs 106 and 107 of the flip-flop, which are associated, respectively, with one of the two stable output states of the flip-flop 105, are connected, on the one hand, with the first inputs of the OR gates 12a to 12p (FIG. 1) and, on the other hand, with respective second inputs, of the AND gates 103 and 104. In this connection, the output 107 leads to the second input of the AND gate 103 and the output 106 leads to the second input of the AND gate 104. By this means, the AND gates 103 and 104 are caused to conduct alternatingly and, in fact, when a signal different from zero appears at the corresponding output 107 or 106, respectively, of the flip-flop 105. Through the alternating release or opening of the AND gates 103 and 104, the inputs of the flip-flop 105 are fed signals alternatingly, thereby ensuring the change of state of the flip-flop 105 to a respective stable output state, as described hereinbefore. The output signals of the flip-flop 105, which are fed to the control electrodes 56 and 57 of the respective transistors 54 and 55, adjust the latter to the conductive state which terminates with the respective flip-flop output pulse. If thyristors, which can be extinguished or cut off by control pulses, are provided in lieu of the transistors 54 and 55, measures must be taken to divert, at the end of each flip-flop output pulse, an additional extinguishing pulse for the thyristor which is conducting at the time. This is advantageously achieved by means of a non-illustrated differentiating circuit which responds to the rear flank of the respective flip-flop output pulse.

Figure 4:
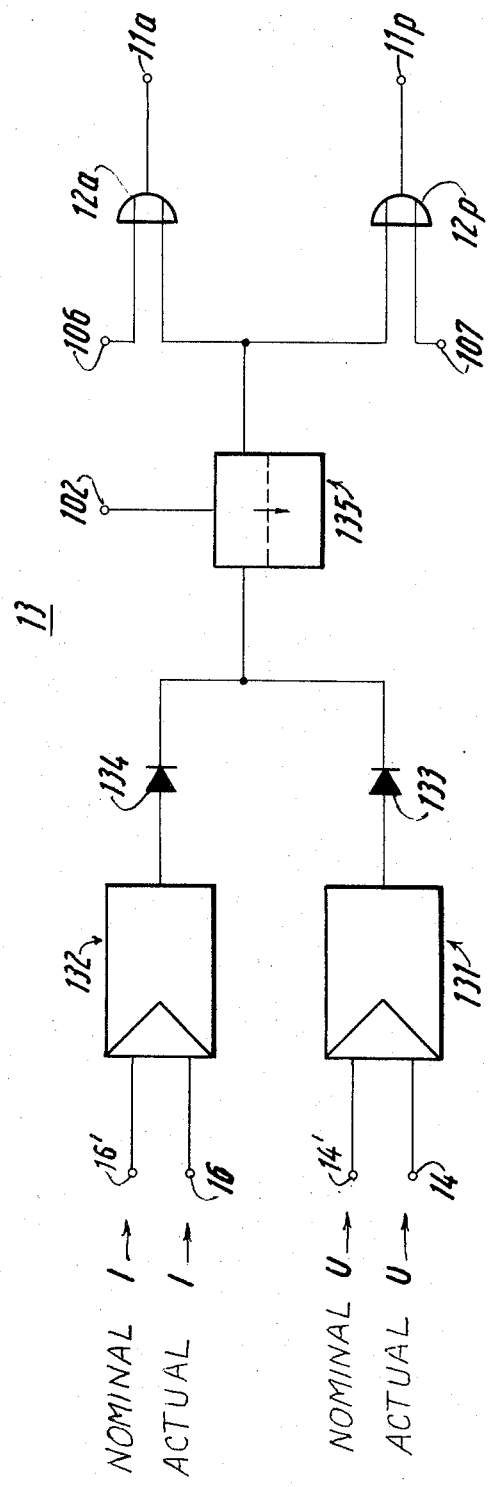
FIG. 4 is a circuit diagram of an embodiment of a control device represented by a fourth block in FIG. 1.

An embodiment of the control device 13 symbolized by a block in FIG. 1 is shown in FIG. 4. The control device 13 includes differential amplifiers 131 and 132 having first inputs 14 and 16, respectively, which are fed actual values of the load voltage $u_v$ and the generator current $i_g$, respectively. The second inputs 14' and 16', respectively, of the differential amplifiers 131 and 132 are each connected with a d-c voltage source, not shown in FIG. 4, which supplies the corresponding desired or nominal values for the load voltage $u_v$ and the generator current $i_g$, respectively. A difference signal $\Delta u_v$ or $\Delta i_g$ appears at the outputs of the difference amplifiers 131 and 132, respectively, only when the actual voltage value exceeds the desired or nominal voltage value, or the actual current value falls below the desired or nominal current value. The outputs of the difference amplifiers 131 and 132 are parallel-connected through diodes 133 and 134, which have the function of a take-over or stripping member. In fact, at the appearance of both a difference signal $u_v$ as well as a difference signal $i_g$, only the signal with the larger amplitude is passed. Connected to the output of the take-over member 133, and 134 is a monostable flip-flop 135, which is further connected to the control output 102 of the control unit 10. The flip-flop 135 is periodically triggered by the control signals of the control unit 10, the duration of the flip-flop output signal being dependent upon the take-over member 133, 134. The output of the monostable flip-flop 135 leads in parallel to the second inputs of the OR gates 12a to 12p.

The dimensioning of the device shown in FIG. 1 is advantageously effected in such a manner that the generator 1 delivers its maximum power for the lowest impedance value of the load 8. With a fixed, predetermined open-circuit value of the voltage of the generator 1, this can be effected by selecting the transformation ratio of the transformer 51 on the assumption that the time interval $\Delta t_k$ has a minimum value, such as the value zero, for example. The desired or nominal value of the generator current $i_g$ is selected at a slight amount below the actual value that appears in this case, so that the differential amplifier 132 is not operative. The desired or nominal value of the load voltage $u_v$ is selected correspondingly a slight amount higher than the actual value which appears at minimum load, so that the differential amplifier 131 is likewise inoperative. With this construction the time interval $\Delta t_k$ has maximum value when the generator 1 is open-circuited, which is equal to one-half the period T of the inverter output signal. In this case, the differential amplifier 131 is continuously operating and the thermionic generator 1 operates short-circuited through the continuously conducting transistors 54 and 55.

If the generator e.m.f. is decreased due to a short circuit of one or more thermionic cells, the differential amplifier 132 becomes active when the instantaneous value of the generator current $i_g$ falls below the preset, desired or nominal value. Due to the intervention or activation of the differential amplifier 132, the instantaneous value of the generator current increases to the value of the short-circuit current, whereby a decrease of the mean value of the generator current below a given limit value is prevented, and thereby an undesirable rise of the temperature of the emitter of the thermionic generator 1 is avoided.

Figure 5:
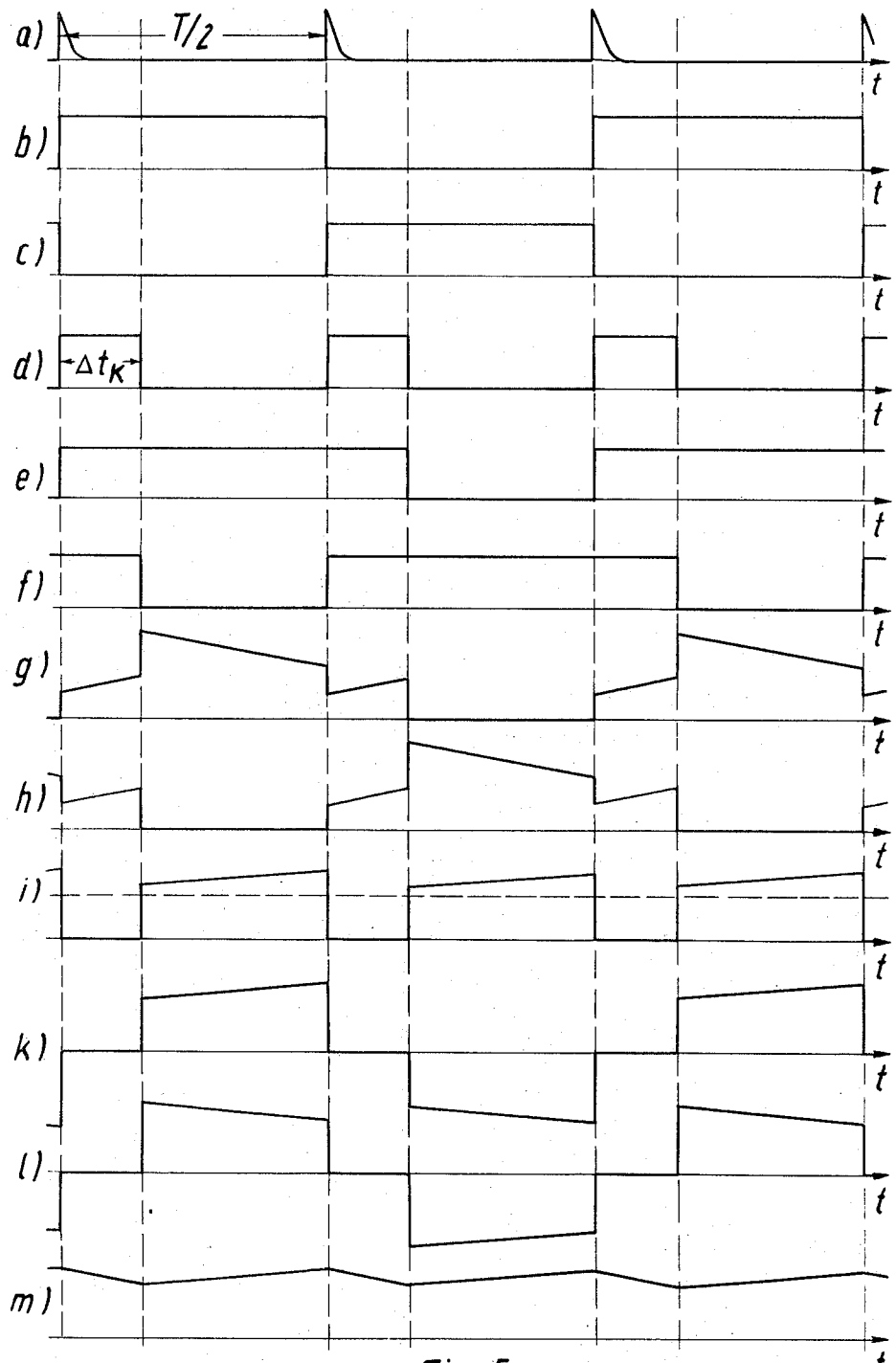
FIGS. 5a to 5i and 5k to 5m are graphs or plot diagrams of current or voltage against time for the various circuit elements shown in FIG. 1.

In FIGS. 5a to 5m, the timing diagrams of the quantities appearing at the various circuit elements of the system shown in FIG. 1 are given. FIG. 5a shows the output voltage of the pulse generator 101; FIG. 5b the voltage at the output 107 of the bistable flip-flop 107; FIG. 5c, the voltage at the output 106 of the bistable flip-flop 105; FIG. 5d, the output voltage of the monostable flip-flop 135; FIG. 5e, the voltage at the control electrode 56 of the transistor 54; FIG. 5f, the voltage at the control electrode 57 of the transistor 55; FIG. 5g the current flowing through the half of the primary winding 52 located at the upper side of FIG. 2a; FIG. 5h, the current flowing through the half of the primary winding 52 located at the lower side of FIG. 2a, FIG. 5i, the input voltage of the inverter 5; FIG. 5k, the output voltage of the inverter 5; FIG. 5l, the output current of the inverter 5; and FIG. 5m, the load voltage $u_v$. As apparent, the input and output voltage of the inverter 5 (FIGS. 5i and 5k) as well as the output current of the inverter 5 (FIG. 5l) are zero during the time interval $\Delta t_k$ of the output signal of the monostable flip-flop 135 (FIG. 5d), while the currents through the two halves of the primary winding 52 (FIGS. 5g and 5h) have the same magnitude and therefore cancel. It is further shown that the load voltage (FIG. 5m) follows the discharge curve of the capacitor 9 during the time interval $\Delta t_k$. The period T of the a-c output voltage of the inverter 5 is determined by twice the pulse spacing between two successive output signals of the pulse generator 101 (FIG. 5a). During half the period, the outputs 106 and 107 of the bistable flip-flop 105 (FIGS. 5a and 5b) are driven alternatingly by square wave signals. The square wave signals of duration $\Delta t_k$ delivered by the monostable flip-flop 135 add at the control electrodes 56 and 57, respectively, to the signals at the outputs 106 and 107 of the bistable flip-flop 105 (FIGS. 5e and 5f). Thereby, the transistors 54 and 55, which respectively conduct current in the absence of an output signal of the monostable flip-flop 135 only during half a period, conduct current also during the current-supply half-period associated with the outer transistor for the duration $\Delta t_k$.

The mean value of the input voltage of the inverter 5 shown by a broken line in FIG. 5i, is equal to the mean value of the terminal voltage of the thermionic generator and thereby determines the magnitude of the generator current $i_o$. With the voltage at the capacitor 9 constant, the mean value of the terminal voltage of the generator 1 can be adjusted, by adjusting the time interval $t_k$, so that the generator always supplies adequate power to cover the effective power delivered to the load 8.

I claim:

1. Device for converting electrical energy of thermionic generator comprising a load and a choke for smoothing current produced by the generator, a p-pulse inverter electrically connected between said load and said smoothing choke, said load being of such value that the generator voltage ($u_o$) is determined by the load voltage ($u_v$), said inverter comprising semiconductor rectifiers, control means electrically connected to said inverter and adapted to cut off the same, at least two of said semiconductor rectifiers being series connected in the current path and being feedable with control signals p times during one period of the inverter output voltage simultaneously for a time interval respectively dependent upon the generator current ($i_o$) and on the load voltage ($u_v$), said semiconductor rectifiers having respective control electrodes, and further comprising a control signal unit and a superimposed control device, said control electrodes being connected through a logic circuit with said control signal unit and said control device, said control device comprising respective controls for minimum generator current ($i_o$) and maximum load voltage ($u_v$) and a monostable flip-flop connected through a take-over member to said controls, said flip-flop being excitable by said control signal unit over a time interval ($\Delta t_k$) determined by the duration of said control signals, for delivering a signal to said control electrodes.

2. Device according to claim 1 wherein said load comprises a resistivity as well as a shunt capacitor, and including rectifier means connected to said inverter for feeding said load.

3. Device according to claim 1 wherein said inverter is a parallel inverter having a centertapped primary transformer winding and a secondary transformer winding, said primary winding having a number of turns selected at a turns ratio with respect to said secondary winding that a maximum load voltage ($u_v$) is attained for minimum values of load impedance and of said time interval ($\Delta t_k$).

4. Device according to claim 1 wherein said semiconductor rectifiers of said inverter adapted to be cut off by said control means are in the form of switching transistors.

* * * * *